(12) United States Patent
Hamanaka et al.

(10) Patent No.: US 9,093,920 B2
(45) Date of Patent: Jul. 28, 2015

(54) DISCHARGE CONTROL APPARATUS FOR POWER CONVERTING SYSTEM WITH CAPACITOR

(75) Inventors: Yoshiyuki Hamanaka, Kariya (JP); Tsuneo Maebara, Nagoya (JP); Yusuke Shindo, Nagoya (JP); Koichi Sakata, Okazaki (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 382 days.

(21) Appl. No.: 13/579,962

(22) PCT Filed: Mar. 30, 2011

(86) PCT No.: PCT/JP2011/058665
§ 371 (c)(1),
(2), (4) Date: Aug. 20, 2012

(87) PCT Pub. No.: WO2011/122706
PCT Pub. Date: Oct. 6, 2011

(65) Prior Publication Data
US 2012/0320649 A1    Dec. 20, 2012

(30) Foreign Application Priority Data
Mar. 31, 2010    (JP) ................................. 2010-080678

(51) Int. Cl.
*H02M 7/48*        (2007.01)
*H02M 1/32*        (2007.01)

(52) U.S. Cl.
CPC .......... *H02M 7/48* (2013.01); *H02M 2001/322* (2013.01)

(58) Field of Classification Search
CPC .. H02M 7/48; H02M 2001/322; H02M 7/537
USPC ........................................ 363/131, 17, 95, 98
See application file for complete search history.

(56) References Cited

U.S. PATENT DOCUMENTS 6,091,615 A  *  7/2000  Inoshita et al. ................. 363/98
8,829,709 B2     9/2014  Pushkolli et al.
(Continued)

FOREIGN PATENT DOCUMENTS

DE    10 2008 043943    7/2009
JP         09-201065    7/1997
(Continued)

OTHER PUBLICATIONS

International Preliminary Report on Patentability dated Oct. 11, 2012, issued in counterpart Japanese Application No. PCT/JP2011/058665.
(Continued)

*Primary Examiner* — Jessica Han
*Assistant Examiner* — Gustavo Rosario Benitez
(74) *Attorney, Agent, or Firm* — Nixon & Vanderhye PC

(57) ABSTRACT

A discharge controller carries out discharge control by determining a voltage to be applied to a conduction control terminal of each of switching elements such that a current in a non-saturation region of one of the switching elements is lower than a current in a non-saturation region of the other thereof, and applying the voltage to the conduction control terminal of each switching element with an opening-closing member opening an electrical path to turn on the switching elements, resulting in short-circuit of both electrodes of a capacitor so that a discharge current is outputted from the capacitor based on the discharge control. A manipulator manipulates, based on a value of the discharge current, how to apply the voltage to the conduction control terminal of the one of the switching elements, thus controlling an amount of heat to be generated in the one of the switching elements.

8 Claims, 4 Drawing Sheets

(56) References Cited

U.S. PATENT DOCUMENTS

| | | | |
|---|---|---|---|
| 2004/0008530 A1* | 1/2004 | Kitahata et al. | 363/131 |
| 2004/0196678 A1* | 10/2004 | Yoshimura et al. | 363/79 |
| 2006/0256597 A1* | 11/2006 | Librizzi et al. | 363/125 |
| 2010/0036555 A1* | 2/2010 | Hosoda et al. | 701/22 |
| 2010/0214055 A1* | 8/2010 | Fuji et al. | 340/3.1 |
| 2011/0080149 A1* | 4/2011 | Fukuta et al. | 323/284 |
| 2012/0104845 A1 | 5/2012 | Pushkolli et al. | |

FOREIGN PATENT DOCUMENTS

| | | |
|---|---|---|
| JP | 2000-316283 | 11/2000 |
| JP | 2003-348856 | 12/2003 |
| JP | 2006-224772 | 8/2006 |
| JP | 2007-181308 | 7/2007 |
| JP | 2008-061300 | 3/2008 |
| JP | 2009-232620 | 10/2009 |

OTHER PUBLICATIONS

International Search Report for PCT/JP2011/058665, mailed Oct. 11, 2011.

Written Opinion for PCT/JP2011/058665, mailed Oct. 11, 2011.

Office Action (1 page) dated Oct. 8, 2013, issued in corresponding Japanese Application No. 2010-080678 and English translation (2 pages).

* cited by examiner (a)

(b)

(c)

DISCHARGE CONTROL APPARATUS FOR POWER CONVERTING SYSTEM WITH CAPACITOR

This application is the U.S. national phase of International Application No. PCT/JP2011/058665 filed 30 Mar. 2011 which designated the U.S. and claims priority to JP Patent Application No. 2010-080678 filed 31 Mar. 2010, the entire contents of each of which are hereby incorporated by reference.

TECHNICAL FIELD

The present disclosure relates to discharge control apparatuses for power converting systems including a DC (Direct Current) power source, a power converter with a switching element electrically connected with the DC power source, and a capacitor electrically interposed therebetween. These power converting systems are operative to convert power of the DC power source to desired power by opening and closing the switching element. More particularly, the present disclosure relates to these discharge control apparatuses operative to short-circuit both electrodes of the capacitor to discharge the capacitor.

BACKGROUND ART

As an example of these power converting systems set forth above, the following power converting system is disclosed in Japanese Patent Application Publication No. 2009-232620. In order to prevent the charge charged in a capacitor from remaining with an inverter as a load being disconnected to the capacitor, the power converting system carries out discharge control to turn simultaneously on a high-side switching and a corresponding low-side switching element of an inverter by a driver to short-circuit both electrodes of the capacitor. This discharges the capacitor. In order to prevent a current flowing through the capacitor from excessively increasing, the power converting system reduces a voltage applied to the gate of an IGBT as a switching element of the system in comparison to a voltage to be normally applied thereto.

CITATION LIST

Patent Literature

PTL1: Patent 2009-232620

SUMMARY OF INVENTION

The inventor has discovered that there is a problem in the power converting system disclosed in Japanese Patent Application Publication No. 2009-232620.

When carrying out the discharge control, the amount of heat generated in the switching element (IGBT) may be excessively increased. Because the amount of heat depends on the amount of current flowing through the switching element, reducing the voltage applied to the gate (control terminal) of the switching element limits the amount of heat generated in the switching element.

However, it may be difficult to control, with high accuracy, the current actually flowing through the switching element caused by: variations in the characteristics of switching elements due to their individual differences and their aging variations; and variations in the applied voltage due to the individual differences of drivers and the aging variations of the drivers. This may result in difficulty in controlling the amount of heat in the switching element.

In view of the circumstances set forth above, an aspect of the present disclosure seeks to provide discharge control apparatuses for power converting systems with a capacitor; these discharge control apparatuses are designed to solve the problem raised in the conventional power converting system set forth above.

Specifically, an alternative aspect of the present disclosure aims to provide new approaches capable of controlling, with high accuracy, the amount of heat in the switching element in carrying out the discharge control.

According to one aspect of the present disclosure, there is provided a discharge control apparatus for a power converting system. The power converting system includes a power convertor including a series-connected member of a voltage-controlled high-side switching element and a voltage-controlled low-side switching element. Each of the voltage-controlled high- and low-side switching elements has a conduction control terminal. The power convertor is configured to convert power of a DC power source into desired power. The power converting system includes a capacitor electrically interposed between the power converter and the DC power source, and an opening-closing member configured to open and close an electrical path between the power converter and the DC power source. The discharge control apparatus includes a discharge controller that carries out discharge control by: determining a voltage to be applied to the conduction control terminal of each of the high- and low-side switching elements such that a current in a non-saturation region of one of the high- and low-side switching elements is lower than a current in a non-saturation region of the other of the high- and low-side switching elements; and applying the voltage to the conduction control terminal of each of the high- and low-side switching elements with the opening-closing member opening the electrical path to turn on both of the high- and low-side switching elements. This results in a short-circuit of both electrodes of the capacitor so that a discharge current is outputted from the capacitor based on the discharge control.

The discharge control apparatus also includes a manipulator that manipulates, based on a value of the discharge current, how to apply the voltage to the conduction control terminal of the one of the high- and low-side switching elements so as to control an amount of heat to be generated in the one of the high- and low-side switching elements.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF DRAWINGS

Other aspects of the present disclosure will become apparent from the following description of embodiments with reference to the accompanying drawings in which.

Figure 2:
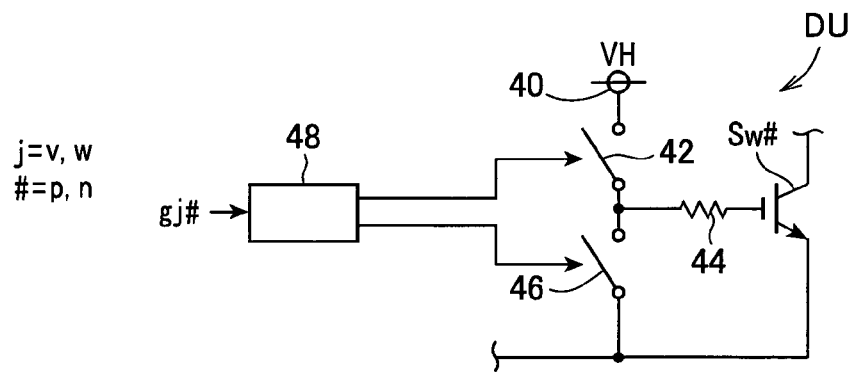
Figure 2:
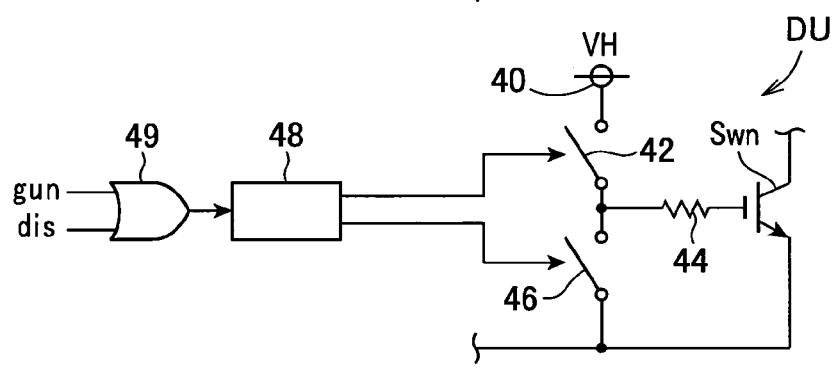
Figure 2:
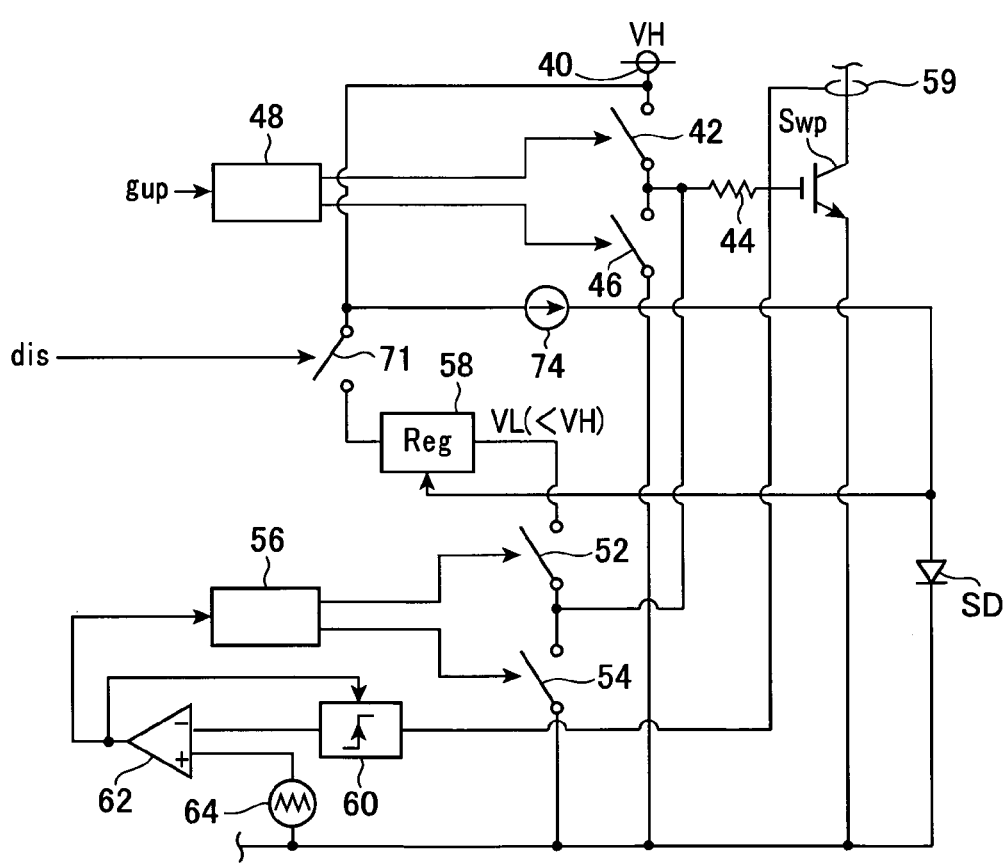
Figure 3:
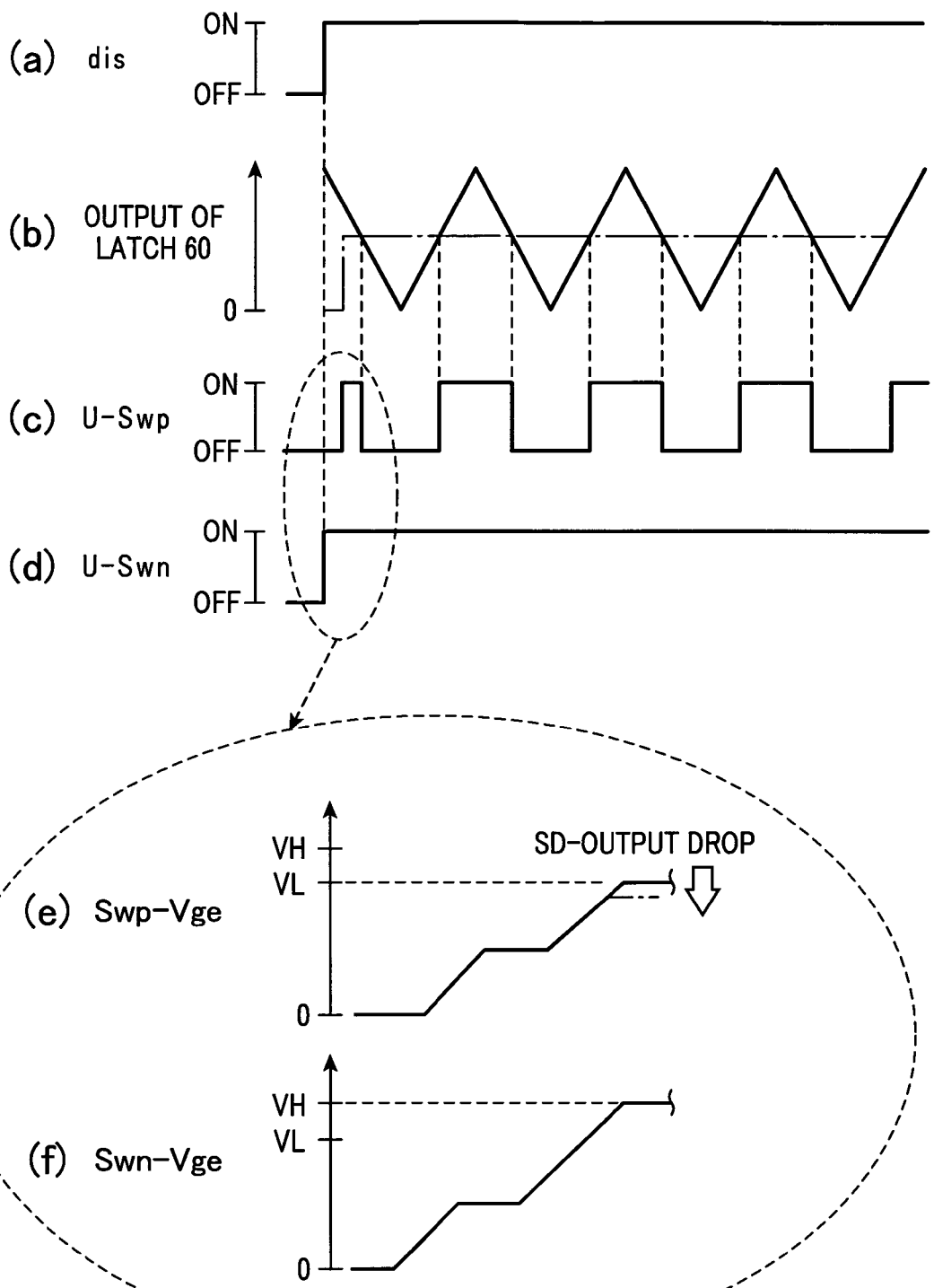
Figure 4:
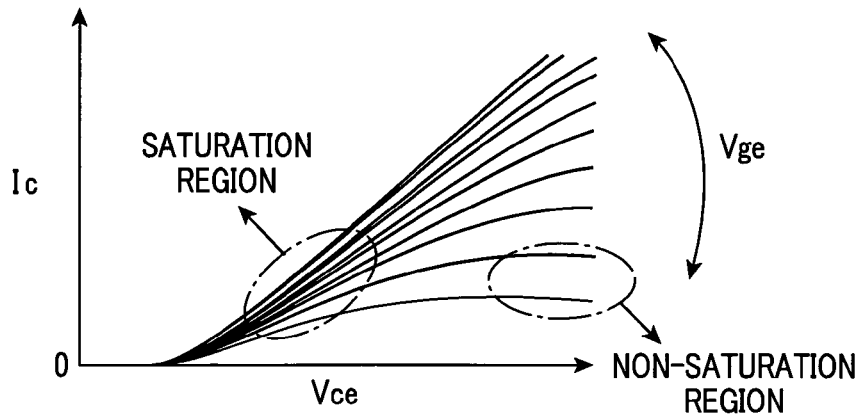
Figure 5:
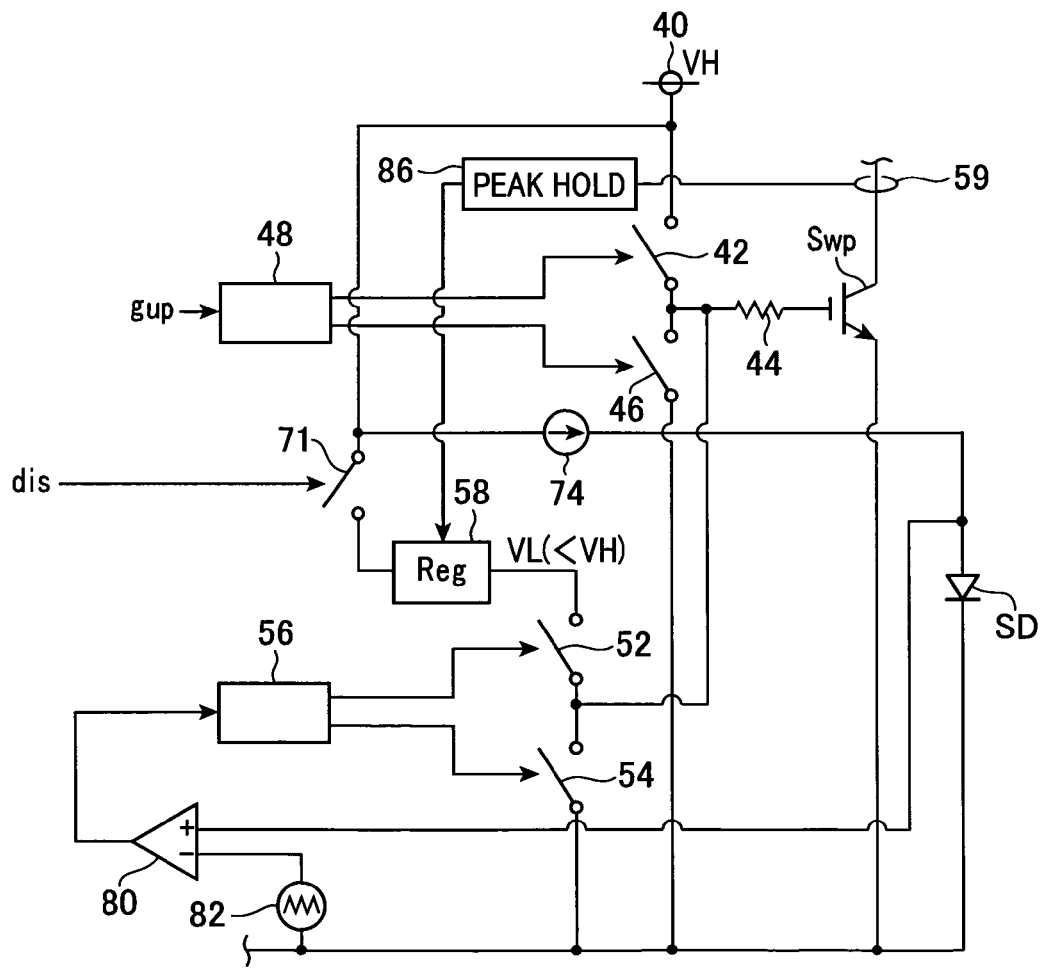

(a) of FIG. 2 is a circuit diagram schematically illustrating an example of the structure of each of drive units for V- and W-phase switching elements according to the first embodiment;

(b) of FIG. 2 is a circuit diagram schematically illustrating an example of the structure of a drive unit for a low-side (lower-arm) switching element for a U-phase winding according to the first embodiment;

(c) of FIG. 2 is a circuit diagram schematically illustrating an example of the structure of a drive unit for a high-side (upper-arm) switching element for the U-phase winding according to the first embodiment;

(a)-(f) of FIG. 3 are timing charts schematically illustrating operations of the drive unit DU for the U-phase high-side switching element, which operates in a discharge control mode based on a discharge command for abnormality according to the first embodiment;

FIG. 4 is a graph schematically illustrating a relationship between collector current and voltage to be applied to the gate of a switching element according to the first embodiment; and FIG. 5 is a circuit diagram schematically illustrating an example of the structure of a drive unit for a high-side (upper-arm) switching element for the U-phase winding according to the second embodiment of the present invention.

DESCRIPTION OF EMBODIMENTS

Embodiments of the present disclosure will be described hereinafter with reference to the accompanying drawings. In each of the embodiments, a discharge control apparatus of a power converting system is applied to, for example, a hybrid vehicle in which a three-phase motor-generator 10 is installed as a main machine.

First Embodiment

Figure 1:
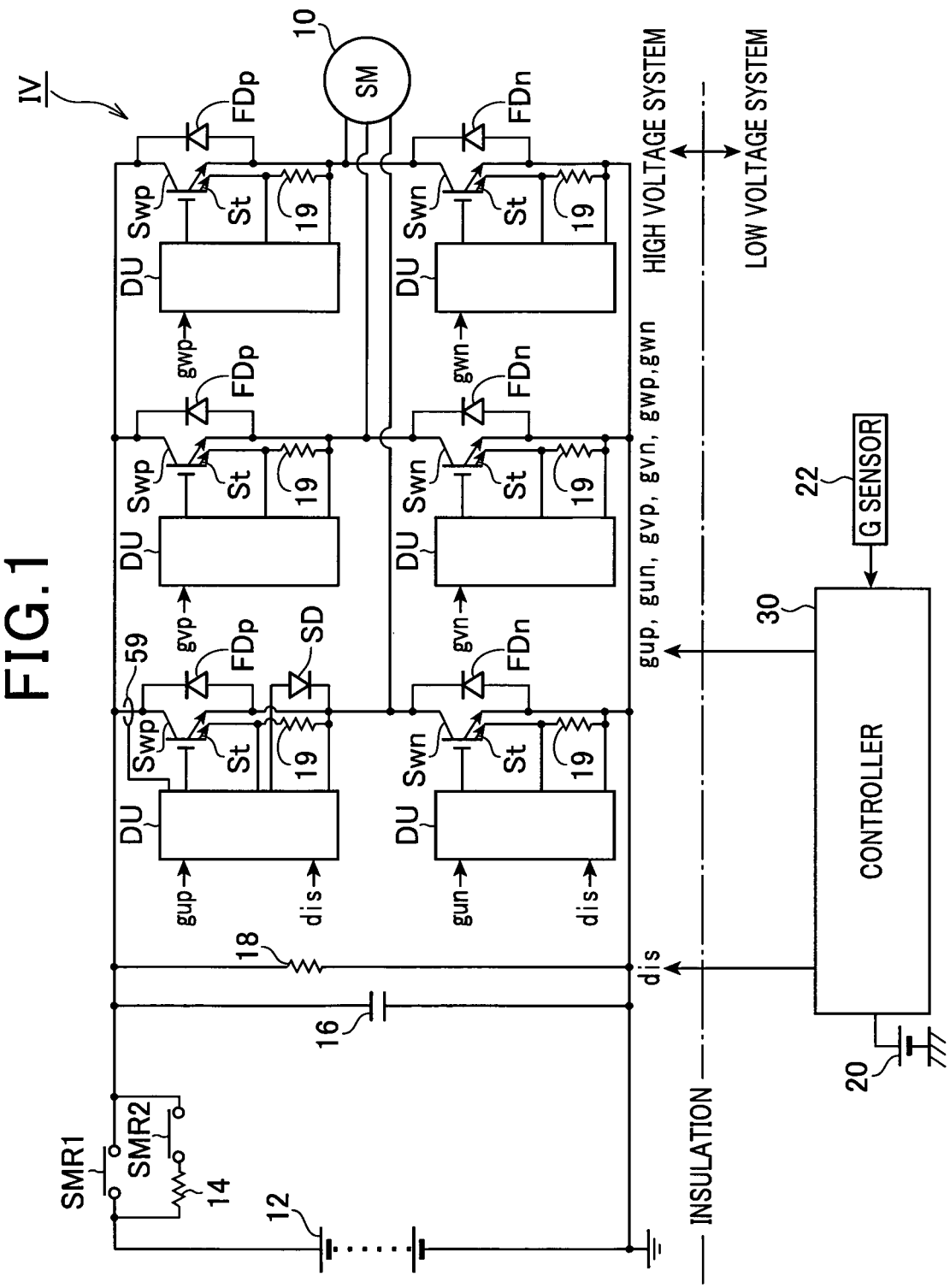
FIG. 1 is a circuit and block diagram of a power converting system according to the first embodiment of the present invention.

Referring to the drawings, particularly to FIG. 1, there is illustrated a power converting system for converting DC power to AC power to be supplied to the three-phase motor generator 10, referred to simply as the motor-generator 10 joined mechanically to driving wheels of the hybrid vehicle. The power converting system includes an inverter IV serving as a power converter, a relay SMR1, a relay SMR2, a resistor 14, and a high-voltage battery (battery) 12. The motor-generator 10 is electrically connected with the battery 12 via a parallel circuit consisting of the relay SMR1 and a series circuit of the relay SMR2 and the resistor 14; the relay SMR1 and the series circuit are parallely connected with each other. The battery 12 has a terminal voltage of, for example, several hundred volts and above. The inverter IV has high-side and low-side input terminals with which a resistor 18 and a capacitor 16 are parallely connected. That is, the high-side input terminal of the inverter IV is electrically connected via the parallel circuit with the battery 12, and the resistor 18 and the capacitor 16 are disposed between the inverter IV and the battery 12.

For example, the motor-generator 10 is comprised of three-phase armature windings and a field member. When three-phase sinusoidal driving currents as an example of drive currents for the motor-generator 10 are supplied to flow through the three-phase armature windings via the inverter IV, respectively, the three-phase armature windings generate a magnetic field. The generated magnetic field and a magnetic field generated by the field member rotate any one of the armature and the field member relative to the other thereof to thereby rotate the motor-generator 10 (rotate a rotor of the motor-generator 10).

On the other hand, when the field member is rotated, the rotating field member creates magnetic flux. The created magnetic flux induces a three-phase AC voltage in the three-phase armature windings so that the three-phase AC voltage is supplied as a DC voltage to the battery 12 via the inverter IV and the capacitor 16, charging the battery 12.

The inverter IV is designed as a three-phase inverter. The inverter IV is comprised of three pairs of series-connected high- and low-side switching elements Swp and Swn; these three pairs of high- and low-side switching elements Swp and Swn are parallely connected with each other in bridge configuration.

Ends of the high-side switching elements (upper arms) Swp are collected as a common connection terminal (DC input terminal), and the common connection terminal is connected with one electrode of the capacitor 16, one end of the resistor 18, and the positive electrode of the battery 12 via the parallel circuit. Ends of the low-side switching elements (lower arms) Swn are collected as a common connection terminal (DC input terminal), and the common connection terminal is connected with the other electrode of the capacitor 16, the other end of the resistor 18, and the negative electrode of the battery 12.

For example, the three-phase armature windings (U-, V-, and W-phase windings) each have one end connected to a common junction (neutral point) and the other end to a separate terminal in, for example, a star-configuration. The three-phase armature windings in the star-configuration have a relative phase shift of 120 degrees. The separate terminal of each of the U-, V-, and W-phase windings is connected with the connection point between a corresponding one of the three pairs of high- and low-side switching elements Swp and Swn.

The inverter IV is also comprised of flywheel diodes FDp connected between input and output terminals (collector and emitter) of each of the high-side switching elements Swp. Similarly, the inverter IV is comprised of flywheel diodes FDn connected between input and output terminals (collector and emitter) of each of the low-side switching elements Swn.

Specifically, the cathode of each of the flywheel diodes FDp is connected with the collector of a corresponding one of the switching elements Swp, and the anode thereof is connected with the source of a corresponding one of the switching elements Swn. Each of the switching elements Swp and Swn has a sense terminal St for outputting a minute electric current associated with a current flowing between the input and output terminals thereof.

The power converting system also includes six shunt resistors 19 each electrically connected with the sense terminal St of a corresponding one of the switching elements Swp and Swn, and six drive units DU. Each of the drive units DU is electrically connected with both ends of a corresponding one of the shunt resistors 19, and with the gate (conduction control terminal) of each of the switching elements Swp and Swn.

The minute electric current outputted from the sense terminal St of a switching element Sw# (# is an index representing p or n) flows through the shunt resistor 19 so that the voltage drop by the shunt resistor 19 is captured by the drive unit DU for driving the switching element Sw#.

The drive unit DU is operative to:

determine, based on the captured voltage drop, whether the current flowing between the input and output terminals of the switching element Sw# is equal to or greater than a threshold current Ith, and forcibly turn off the switching element Sw# when it is determined that the current flowing between the input and output terminals of the switching element Sw# is equal to or greater than the threshold current Ith.

The power converting system further includes a controller 30. The controller 30 is designed as, for example, a computer circuit consisting essentially of, for example, a CPU, an I/O interface, and a memory unit, and operates on a low-voltage battery 20 lower than the battery 12 as its power source. Thus, the controller 30 constitutes a low voltage system.

The controller 30 is designed to drive the inverter IV to supply three-phase sinusoidal drive currents to the three-phase armature windings (U-, V-, and W-phase windings U, V, and W) based on the terminal voltage of the battery 12, thus rotating the rotor of the motor-generator 10. The controller 30 is also designed to adjust controlled variables of the motor-generator 10 as controlled targets thereof to desired values in normal control mode.

Specifically, according to pieces of data sent from various sensors, for example, current sensors and an angular sensor, the controller 30 is operative to generate:

a drive signal gup for driving the switching element Swp for the U-phase winding;

a drive signal gun for driving the switching element Swn for the U-phase winding;

a drive signal gyp for driving the switching element Swp for the V-phase winding;

a drive signal gun for driving the switching element Swn for the V-phase winding;

a drive signal gwp for driving the switching element Swp for the W-phase winding; and a drive signal gwn for driving the switching element Swn for the W-phase winding.

Each of the drive signals gup, gun, gyp, gvn, gwp, and gum is, for example, a pulse signal with a controllable duty cycle, that is, the ratio of a controllable pulse width or a controllable on time to a corresponding period (on time+off time).

Specifically, the controller 30 is operative to supply, via the drive nits DU, to the gate of each of the switching elements Swp and Swn to thereby individually adjust the duty cycle of each of the drive signals gup, gun, gyp, gyn, gwp, and gwn. This adjusts the duty cycle, such as on time of each of the switching elements Swp and Swn compared to its period (on and off time), thus regulating the controlled variables of the motor-generator 10 to desired values.

The power converting system includes an acceleration sensor (G sensor) 22 electrically connected with the controller 30. The acceleration sensor 22 is designed to measure acceleration based on force applied thereto, and determine, based on the measured acceleration, whether there is a collision of the hybrid vehicle. If there is a collision of the hybrid vehicle, the acceleration sensor 22 is designed to output, to the drive unit DU for each of the U-phase switching elements Swp and Swn, a discharge command dis signaling abnormality that forcibly discharges the capacitor 16 in discharge control mode.

Note that the high-voltage system including the inverter IV, and the battery 12 and the lower voltage system including the controller 30 are connected with each other by an insulator (INSULATION in FIG. 1), such as, for example, photo-couplers. The insulator is configured to establish electrical insulation between the low voltage system (the controller 30) and the high voltage system (the battery 12 and the inverter IV), and to allow communications therebetween. Thus, the drive signals g*# (* is an index representing u, v, or w, and # is an index representing p or n) and the discharge command dis are outputted to the high-voltage system via the insulator.

FIG. 2 illustrates a structural view of drive units DU for turning on and off the corresponding switching elements Sw#. Specifically, (a) of FIG. 2 illustrates an example of the structure of each of the drive units DU for the V- and W-phase switching elements Sw#, and (b) of FIG. 2 illustrates an example of the structure of the drive unit DU for the low-side (lower-arm) switching element Swn for the U-phase winding. In addition, (c) of FIG. 2 illustrates an example of the structure of the drive unit DU for the high-side (upper-arm) switching element Swp for the U-phase winding.

As illustrated in (a) of FIG. 2, the drive unit DU for each of the V- and W-phase switching elements Sw# includes a power source 40 with a terminal voltage VH, a charge switching element 42, a gate resistor 44, a discharge switching element 46, and a drive controller 48. The terminal voltage VH of the power source 40 is applied to the conduction control terminal (gate) of the switching element Sw# via the charge switching element 42 and the gate resistor 44. The gate of the switching element Sw# is electrically connected with the output terminal (emitter) thereof via the gate resistor 44 and the discharge switching element 46; this path serves as a discharge path. The charge switching element 42 and the discharge switching element 46 are turned on and off by the drive controller 48 according to the drive signals gj# (j=v or w). This causes the switching element Sw# to be turned on and off.

As illustrated in (b) of FIG. 2, the drive unit DU for the low-side switching element Swn for the U-phase winding basically has the same structure as that of the drive unit DU illustrated in (a) of FIG. 2 except for the following point. Specifically, the drive unit DU for the low-side switching element Swn for the U-phase winding further includes an OR circuit 49 to which the drive signal gun and the discharge command dis are inputted. The OR circuit 49 supplies, to the drive controller 48, a logical sum signal between the drive signal gun and the discharge command dis. In other words, the OR circuit 49 supplies, to the drive controller 48, either the drive signal gun or the discharge command dis.

As illustrated in (c) of FIG. 2, the drive unit DU for the high-side switching element Swp for the U-phase winding basically has the same structure as that of the drive unit DU illustrated in (a) of FIG. 2 except for the following points.

Specifically, the drive unit DU for the U-phase high-side switching element Swp further includes a regulator 58, a switching element 71, a charge switching element 52, a discharge switch 54, and a drive controller 56 for abnormality. The drive unit DU for the U-phase high-side switching element Swp also includes a current sensor 59, a latch 60, a comparator 62, an oscillator 64, a temperature sensitive diode SD, and a constant current circuit 74.

The regulator 58 steps down the terminal voltage VH of the power source 40. The switching element 71 is designed to open or close according to the discharge command dis to open or close the electrical path between the power source 40 and the regulator 58. This allows an output voltage VL of the regulator 58, which is lower than the terminal voltage VH, to be applied to the gate of the switching element Swp via the charge switching element 52 and the gate resistor 44. The gate of the switching element Swp is electrically connected with the emitter thereof via the gate resistor 44 and the discharge switch 54. The charge switching element 52 and the discharge switching element 54 are turned on and off by the drive controller 56 under circumstances in which the discharge command dis is outputted. Note that the switching element 71 is a normally-open switch, which makes contact when the discharge command dis is inputted.

A discharge current through the switching element Swp from the capacitor 16 caused by the discharge control (described in detail later) in response to the discharge command dis is measured by the current sensor 59 having, for example, a hall element as a voltage sensor. The measured voltage is applied as, for example, a manipulated variable for controlling the amount of heat to be generated in each of the switching elements Swp and Swn, to the inverting input terminal of the comparator 62 via the latch 60. To the non-inverting input terminal of the comparator 62, an electric output signal (a carrier) having a predetermined frequency and outputted from the oscillator 64 is applied. This allows the comparator 62 to output a signal with a logical high to the drive controller 56 if a value of the measured voltage by the current sensor 59 is lower than a corresponding value of the carrier. Note that the latch 60 is operative to latch the value of the measured voltage inputted thereto in response to when the output signal of the comparator 62 is the signal with the logical high.

The output signal of the comparator 62 is inputted to the drive controller 56. This allows the high-side switching element Swp to be on while the output signal of the comparator 62 is logical high.

The temperature sensitive diode SD is disposed close to the high-side switching element Swp and operative to measure the temperature of the high-side switching element Swp. Specifically, the cathode of the temperature sensitive diode SD is electrically connected with the emitter of the switching element Swp, and the anode is electrically connected with an output terminal of the constant current circuit 74 operating based on the terminal voltage VH of the power source 40. The voltage at the anode of the temperature sensitive diode SD is captured to the regulator 58. The regulator 58 variably determines an output voltage VL lower than the terminal voltage VH according to the temperature measured by the temperature sensitive diode SD. Note that the output voltage of the temperature sensitive sensor SD and the temperature of a target to be measured is negative-correlated therebetween.

FIG. 3 schematically illustrates operations of the drive unit DU for the U-phase high-side switching element Swp, which operates in the discharge control mode based on the discharge command dis. Specifically, (a) of FIG. 3 schematically illustrates a transition of the discharge command dis, and (b) of FIG. 3 schematically illustrates a transition of the output signal of the latch 60 (see the dashed line), and a transition of the carrier to be outputted from the oscillator 64. (c) of FIG. 3 schematically illustrates a transition of the U-phase high-side switching element Swp, and (d) of FIG. 3 schematically illustrates a transition of the U-phase low-side switching element Swn. As illustrated in FIG. 3, in the first embodiment, the U-phase high-side switching element Swp is periodically turned on and off with the U-phase low-side switching element Swn being kept on. Thus, there are periods within which the high-side and low-side switching elements Swp and Swn are simultaneously on, and, for each period, both electrodes of the capacitor 16 are short-circuited via the switching elements Swp and Swn, so that the capacitor 16 is discharged.

At that time, the structures of the drive units DU for the U-phase high-side and low-side switching elements Swp and Swn allow the voltage applied to the gate of the high-side switching element Swp to be lower than that applied to the gate of the low-side switching element Swn (see (e) and (f) of FIG. 3). Note that (e) of FIG. 3 schematically illustrates a transition of the gate-emitter voltage Vge of the high-side switching element Swp, and (f) of FIG. 3 schematically illustrates a transition of the gate-emitter voltage Vge of the low-side switching element Swn.

For example, the regulator 58 reduces the output voltage VL as the output (measured temperature) of the temperature sensitive diode SD drops (see (e) of FIG. 3).

With the structures of the drive units DU for the U-phase high-side and low-side switching elements Swp and Swn, the high-side switching element Swp is driven in its non-saturation region and the low-side switching element Swn is driven in its saturation region. Note that, as illustrated in FIG. 4, the saturation region of a switching element is a region within which the voltage (collector-emitter voltage Vce) between the input and output terminals of the switching element is increased depending on the output current (collector current Ic). On the other hand, the non-saturation region of a switching element is a region within which the collector-emitter voltage Vce between the input and output terminals of the switching element is increased without the output current (collector current Ic) being increased. The collector current Ic in the non-saturation region is increased with increase in the voltage (gate-emitter voltage Vge) to be applied to the gate of the switching element.

The gate voltage to be applied to the gate of the low-side switching element Swn, which is lower than that to be applied to the gate of the high-side switching element Swp, reduces the level of a current in the non-saturation region of the high-side switching element Swp in comparison to the level of a current in the non-saturation region of the low-side switching element Swn. This allows a current flowing through each of the high-side and low-side switching elements caused by the discharge control set forth above to be limited to the current in the non-saturation region of the high-side switching element Swp. Note that the current in the non-saturation region of the high-side switching element Swp is preferably set to be lower than the threshold current Ith defined by the corresponding drive unit DU. Note that the terminal voltage TH allows the threshold current Ith to be within the saturation region. That is, in controlling the controlled variables of the motor-generator 10 in the normal control mode, the switching elements Swp and Swn are driven in the saturation region.

Note that, for the discharge control (open loop control) using discharge command dis as a trigger signal set forth above, it is preferable that the amount of heat to be generated in each of the U-phase high- and low-side switching elements Swp and Swn is prevented from being excessively increased. This prevents the reduction in the reliability of each of the U-phase high- and low-side switching elements Swp and Swn. The amount of heat to be generated in each of the switching elements Swp and Swn per unit of time depends on current flowing through a corresponding one of the switching elements Swp and Swn. The amount of heat to be generated in each of the switching element Swp and Swn also depends on the on time of one switching of the switching element Swp and the off time of one switching of the switching element Swp.

As described above, the current flowing through each of the switching elements Swp and Swn can be controlled based on the voltage to be applied to the gate of the switching element Swp, but it is probably difficult to enhance the controllability of the current flowing through each of the switching elements Swp and Swn. This is because:

the voltage to be applied to the gate of the switching element Swp may vary caused by variations in the applied voltage due to the individual differences of drive units DU and the aging variations thereof; and the current in the non-saturation region may vary caused by variations in the characteristics of switching elements Swp due to their individual differences and their aging variations.

In order to address such circumstances, the discharge control apparatus according to this embodiment is configured to measure the temperature of the switching element Swp as a controlled variable by the temperature sensitive diode SD, and carry out feedback control of the measured temperature such that the measured temperature is not excessively increased. The reason why the controlled variable of the feedback control is the temperature of the switching element Swp is that most of the amount of heat generated caused by the discharge control is based on the amount of heat generated in the high-side switching element Swp driven in its non-saturation region.

Note that it is probably very difficult to equally divide the amount of heat by driving both of the high- and low-side switching elements Swp and Swn in their non-saturation regions due to the individual differences of drive units DU and switching elements Swp, Swn and the aging variations thereof. Specifically, these individual differences and aging variations may be subject to the difference between the current in the non-saturation region of the switching element Swp and that in the non-saturation region of the switching element Swn. The difference may increase the amount of heat generated in one of the switching elements Swp and Swn; this one of the switching elements Swp and Swn is lower in current in non-saturation region than the other thereof. Note that, if the controlled variable were the temperature of each of the switching elements Swp and Swn, the feedback control would become very complicated. For this reason, in this embodiment, the voltage to be applied to the gate of the high-side switching element Swp is set to be lower than the voltage to be applied to the gate of the switching element Swn. This previously specifies, as the source of the controlled variable, the switching element Swp with the amount of heat to be generated therein being greater than that of heat to be generated in the switching element Swn.

As illustrated in FIG. 2, in this embodiment, as a manipulated variable of the temperature feedback control, the voltage to be applied to the gate of the switching element Swp is used. This reduces the volt ge to be applied to the gate of the switching element Swp when the output voltage of the temperature sensitive diode SD is decreased, that is, the temperature measured by the temperature sensitive diode SD is increased (see (e) of FIG. 3). This allows the current in the non-saturation region of the switching element Swp to be reduced, making it possible to reduce the discharge current.

The discharge control apparatus according to this embodiment is configured to control, as a direct controlled variable, the amount of heat to be generated in the switching element Swp so that the amount of heat is prevented from being excessively increased; this amount of heat is grasped based on the discharge current generated by the discharge control. This makes it possible to reduce the margins of the feedback control. Specifically, the feedback control uses, as a direct control variable, a parameter (applied voltage) for preventing reduction in the reliability of each of the switching elements Swp and Swn.

For this reason, in order to reliably prevent reduction in the reliability, increase in the amount of the margins of the feedback control may be required. For addressing such a requirement, the discharge control apparatus according to this embodiment is configured to focus on the current flowing through the switching element Swp as the cause of the generation of heat without focusing the temperature of the switching element Swp as the result of the generation of heat. This immediately responses a case where an excessive increase in the amount of heat to be generated in each of the switching elements Swp and Swn in a unit of time as a result of the discharge control (open loop control) using the discharge command dis as a trigger signal is deviated from a predicted value.

Specifically, execution of the discharge control illustrated in FIG. 3 allows the duty cycle, that is, on time of the high-side switching element Swp compared to its cycle (on and off time), to be reduced with increase in the value of the output signal of the latch 60, in other words, with increase in the discharge current. This controls, if the discharge current is high, to reduce the amount of heat to be generated in the switching element Swp in a unit of time, for example, one period of the carrier, thus preventing the amount of heat to be generated in the switching element Swp in a unit of time.

Note that, as illustrated in FIG. 3, the discharge control apparatus according to this embodiment is configured to turn on and off the high-side switching element Swp several times while maintaining the low-side switching element Swn in on state. This configuration aims to prevent the reduction in the controllability of current flowing through each of the high- and low-side switching elements Swp and Swn. An example of the reduction in the controllability of current is that an excessively high current flows through each of the high- and low-side switching elements Swp and Swn. Specifically, if the discharge control apparatus according to this embodiment turned on and off the low-side switching element Swn several times while maintaining the high-side switching element Swp in on state, the following point to be improved would appear, which has been found out by the inventors. Specifically, at a transient period in which the low-side switching element Swn is switched from its off state to its on state, the voltage applied to the gate of the high-side switching element Swp would be increased over the output voltage VL of the regulator 58. This would result in reduction in the controllability of current flowing through each of the switching elements Swp and Swn, which has been found out by the inventors. The discharge control illustrated in FIG. 3, which turns on the low-side switching element Swn after the output of the discharge command dis, and turns on the high-side switching Swp after the turning on of the low-side switching element Swn, reliably prevents the reduction in the controllability of current flowing through each of the switching elements Swp and Swn.

Note that an alternative discharge control to turn on and off simultaneously the high- and low-side switching elements Swp and Swn several times requires to variably set the duty cycle (on time) of each of the high-side and low-side switching elements Swp and Swn compared to its period (on and off time) as a manipulated variable. This causes the following point to be improved. Specifically, in the alternative discharge control, if the duty cycle of each of the upper- and lower-arm switching elements Swp and Swn were individually controlled, this would reduce the controllability of the amount of heat to be generated in each of the upper-arm and lower-arm switching elements Swp and Swn. In addition, if no on and off operations of the upper- and lower-arm switching elements were carried out with communications therebetween, it would be difficult to change the switching state of the high-side switching element Swp during the low-side switching element Swn being off state.

Note that, in this embodiment, the manipulated variable grasped based on the discharge current for controlling the amount of heat to be generated in each of the switching element Swp and Swn, is different from that for the temperature feedback control. This simplifies the structure of the discharge control apparatus.

As described above, the discharge control apparatus according to this embodiment is configured to control the amount of heat to be generated in the high-side switching element Swp based on the measured values of the discharge current in carrying out the discharge control to drive the high-side switching element Swp in its non-saturation region while driving the low-side switching element Swn in its saturation region. This configuration prevents the amount of heat to be generated in the high-side switching element Swp in a unit of time from being excessively increased independently of the individual differences of drive units DU and switching elements Swp, Swn and the aging variations thereof.

The discharge control apparatus according to this embodiment is configured to turn on and off the high-side switching element Swp to be driven in its non-saturation region several times while maintaining the low-side switching element Swn to be driven in its saturation region in on state to short-circuit both electrodes of the capacitor 16. This controls the duty cycle of the switching element Swp to thereby reduce the amount of heat to be generated in the switching element Swp in a unit of time.

In addition, the discharge control apparatus according to this embodiment is configured to control the duty cycle of the high-side switching element Swp. This configuration prevents, in comparison to the configuration to control the duty cycle of the low-side switching element Swn, a through current from being increased.

The discharge control apparatus according to this embodiment is configured to manipulate the voltage to be applied to the gate of the high-side switching element Swp being driven in its non-saturation region so as to carry out feedback control of the temperature of the high-side switching element Swp. This configuration prevents each of the switching elements Swp and Swn from being excessively increased due to the discharge control.

Moreover, the discharge control apparatus according to this embodiment is configured such that the manipulated variable grasped based on the discharge current for controlling the amount of heat to be generated in each of the switching element Swp and Swn is different from that for the temperature feedback control. This facilitates the simplicity of the structure of the discharge control apparatus.

Second Embodiment

A discharge control apparatus according to the second embodiment of the present disclosure will be described hereinafter with reference to FIG. 5.

The structure of the discharge control apparatus according to the second embodiment is substantially identical to that of the discharge control apparatus according to the first embodiment except for the following different points. So, like parts between the discharge control apparatuses according to the first and second embodiments, to which like reference characters are assigned, are omitted or simplified in description.

The discharge control apparatus according to this embodiment is configured such that the manipulated variable grasped based on the discharge current for controlling the amount of heat to be generated in each of the switching element Swp and Swn and that for the temperature feedback control according to the first embodiment are replaced with each other.

FIG. 5 illustrates an example of the structure of a drive unit DU for the U-phase high-side (upper-arm) switching element Swp according to this embodiment.

Referring to FIG. 5, the drive unit DU for the U-phase high-side switching element Swp includes a comparator 80 identical to the comparator 62 except for omission of the latch 60, and an oscillator 82 identical to the oscillator 64. The anode of the temperature sensitive diode SD is electrically connected with the non-inverting input terminal of the comparator 80 in place of the regulator 58. The drive unit DU for the U-phase high-side switching element Swp also includes a peak hold circuit 86 electrically connected between the current sensor 59 and the regulator 58.

The output voltage of the temperature sensitive sensor SD is applied to the non-inverting input terminal of the comparator 80. To the inverting input terminal of the comparator 80, the carrier outputted from the oscillator 82 is applied. This allows the duty cycle (on time) of the high-side switching element Swp compared to its period (on and off time) to be reduced with reduction in the output voltage of the temperature sensitive diode SD, in other words, with increase in the temperature measured by the temperature sensitive diode SD. This controls, if the temperature measured by the temperature sensitive diode SD is large, to reduce the amount of heat to be generated in the switching element Swp in a unit of time, for example, one period of the carrier, thus preventing the amount of heat to be generated in the switching element Swp in a unit of time.

On the other hand, the discharge current through the switching element Swp from the capacitor 16 due to the discharge control in response to the discharge command dis is measured by the current sensor 59. A peak of the measured voltage is held by the peak hold circuit 86, and outputted to the regulator 58. The regulator 58 variably determines the output voltage VL lower than the terminal voltage VH according to the outputted peak of the measured voltage. This reduces the voltage to be applied to the gate of the switching element Swp with increase in the discharge current measured by the current sensor 59.

As described above, the discharge control apparatus according to this embodiment achieves the identical technical effects achieved by the discharge control apparatus according to the first embodiment.

Each of the first and second embodiments can be modified as follows.

In each of the first and second embodiments, a manipulator, for example, the drive controller 56, is configured to use, as different parameters, the manipulated variable grasped based on the discharge current for controlling the amount of heat to be generated in each of the switching element Swp and Swn and that for the temperature feedback control, but the present disclosure is not limited thereto. Specifically, the manipulator can be configured to use, as these manipulated variables, the voltage to be applied to the U-phase high-side switching element Swp.

For example, the manipulator includes information indicative of a function between a variable of the temperature to be measured by the temperature sensitive diode SD and a variable of the voltage to be applied to the gate of the switching element Swp. The manipulator also includes information indicative of a function between a variable of the discharge current to be measured by the current sensor 59 and the variable of voltage to be applied to the gate of the switching element Swp. The manipulator is configured to retrieve a pair of values of the voltage to be applied to the gate of the switching element Swp defined based on the functions. The manipulator is also configured to use, as common manipulated variables, one of the pair of the retrieved values of the voltage to be applied to the gate of the switching element Swp; this one of the pair of the retrieved values allows current in the non-saturation region of the switching element Swp to be lower than current in the non-saturation region of the switching element Swp obtained by using the other thereof as the common manipulated variables.

The manipulator according to the present disclosure is not limited to the configuration that carries out the temperature feedback control set forth above.

As a measurer (measuring unit) that measures the discharge current for grasping the amount of heat generated in the switching element Swp, a current sensor with a hall element is used in each of the first and second embodiments, but the present disclosure is not limited thereto. Specifically, as the measurer that measures the discharge current for grasping the amount of heat generated in the switching element Swp, a current sensing circuit with a shunt resistor can be used. The current sensing circuit can be configured to, when the discharge current flows through the shunt resistor, measure the voltage drop across the shunt resistor as a parameter (manipulated variable) indicative of the discharge current.

A discharge controller, for example a combination of the discharge switching element 54, the comparator 62, the latch 60, the oscillator 64, and the temperature sensitive diode SD, according to each of the first and second embodiments is configured to turn on and off the high-side switching element Swp several times while maintaining the low-side switching element Swn in on state to thereby short-circuit both electrodes of the capacitor 16 several periods. The present disclosure is not limited to the configuration.

Specifically, the discharge controller can be configured to turn on and off the low-side switching element Swn several times while maintaining the high-side switching element Swp in an on state to thereby short-circuit both electrodes of the capacitor 16 several periods. In this configuration, the voltage to be applied to the gate of the switching element Swn is lower than that to be applied to the gate of the switching element Swp, and the switching element Swn is driven in its non-saturation region. The configuration can achieve the identical technical effects to be achieved by the discharge control apparatus according to the first embodiment although the point to be improved set forth above remains.

In addition, the discharge controller can also be configured to turn on and off simultaneously the high- and low-side switching elements Swp and Swn several times to thereby short-circuit both electrodes of the capacitor 16 several times. In this configuration, the voltage to be applied to the gate of each of the switching elements Swp and Swn is so adjusted that any one of the switching elements Swp and Swn can be driven in its non-saturation region. In this configuration, it is preferable that one switching element driven in its non-saturation region is switched with the other switching element driven in its saturation region being on state.

Moreover, both the high- and low-side switching elements Swp and Swn can be turned on at once during the discharge control being executed. In this configuration, the voltage to be applied to the gate of each of the switching elements Swp and Swn is so adjusted that any one of the switching elements Swp and Swn can be driven in its non-saturation region.

The present disclosure is not limited to the configuration of each embodiment that carries out the discharge control using only one pair of high- and low-side switching elements Swp and Swn for supplying voltage to one phase winding of the motor-generator 10. Specifically, three pairs of high- and low-side switching elements Swp and Swn can be switched to be successively turned on.

The present disclosure is not limited to the configuration of each embodiment that uses the discharge command dis generated by the controller 30 for abnormality as a trigger. Specifically, the discharge control apparatus according to each embodiment can be equipped with a specific element in the high-voltage system for generating the discharge command dis for abnormality as a trigger.

The discharge control to turn on both the high- and low-side switching elements Swp and Swn can be carried out in normal conditions, in addition to abnormal conditions, each time the relay SMR 1 is switched.

In the present disclosure, the U-phase upper-arm drive unit DU is not limited to the configuration that includes separately a pair of the charge switching element 42 and the discharge switching element 46 in normal conditions, and a pair of the charge switching element 52 and the discharge switching element 54 in abnormal conditions. For example, the U-phase upper-arm drive unit DU can include one pair of a charge switching element and a discharge switching element, and one pair of a first means for applying voltage to the input terminal of the charge switching element in normal conditions and a second means for applying voltage to the input terminal of the charge switching element in abnormal conditions.

The present disclosure may or may not include a function of forcibly turning off the switching element Sw#.

As a DC/AC inverter (inverter IV) for turning on both a pair of high- and low-side switching elements to thereby carry out discharge control, the present disclosure is not limited to the inverter IV for mediating power transfer between the motor-generator 10 as the main machine installed in the hybrid vehicle and the high-voltage battery 12. For example, the present disclosure can be configured to mediate power transfer between a rotary machine as another machine installed in the hybrid vehicle and the high-voltage battery 12.

In each of the first and second embodiments, the latch 60 latches a value of the measured voltage by the current sensor as a measured value of the discharge current during one discharge control period, and, thereafter, maintains the latched value, but the present disclosure is not limited to the configuration. Specifically, the latch 60 can be preferably configured to latch a peak (local maximum value) of the measured voltage by the current sensor as a peak (local maximum value) of the discharge current, and update the previously latched value to a newly latched value every on operation of a switching element that is controlled to be repeatedly turned on and off.

In each of the first and second embodiments, as the switching elements Swp and Swn, IGBTs are respectively used, but field effect transistors, such as power MOSFETs, can be used. When power MOSFETs are used as the switching elements Swp and Swn, intrinsic diodes of the power MOSFETs can be used as the flywheel diodes, thus eliminating the flywheel diodes.

With the input terminals of the inverter IV, a step-up converter can be electrically connected; this step-up converter is comprised of a reactor, a switching member electrically connected with the capacitor 16 in parallel thereto, a freewheel diode electrically connected in series with the switching element, and a capacitor electrically connected with its output terminals and with the series member consisting of the switching element and the freewheel diode. The inverter IV can be electrically connected with output terminals of the step-up converter. In this modification, the capacitor electrically connected with the output terminals of the step-up converter and the capacitor 16 are targets of the discharge control, and therefore, the voltage across both electrodes of the capacitor 16 is discharged through the freewheel diode as the voltage across the capacitor of the step-up converter drops. Note that, if the high-side switching elements are electrically connected with the freewheel diode of the step-up converter, turning on one pair of switching elements electrically connected between the output terminals of the step-up converter can carry out the discharge control.

The discharge control apparatus of the power converting system is applied to a hybrid vehicle, but can also be used in an electrical motor vehicle that stores therein only electric energy for a main machine installed in the vehicle.

The discharge control apparatuses can be applied to a power converting system for converting DC power to AC power; this power converting system is provided in a corresponding house. In this modification, if an earthquake is detected, the acceleration sensor 22 is designed to determine that an abnormality occurs in the house, and carry out the discharge control.

While illustrative embodiments of the invention have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

The invention claimed is:

1. A discharge control apparatus for a power converting system, the power converting system comprising: a power converter including a series-connected member of a voltage-controlled high-side switching element and a voltage-controlled low-side switching element, each of the voltage-controlled high- and low-side switching elements having a conduction control terminal, the power converter being configured to convert power of a DC power source into a desired power; a capacitor electrically interposed between the power converter and the DC power source; and an opening-closing member configured to open and close an electrical path between the power converter and the DC power source, the discharge control apparatus comprising:
 a discharge controller that is configured to carry out discharge control by:
  determining a voltage to be applied to the conduction control terminal of each of the high- and low-side switching elements such that a current in a non-saturation region of one of the high- and low-side switching elements is lower than a current in a non-saturation region of the other of the high- and low-side switching elements; and
  applying the voltage to the conduction control terminal of each of the high- and low-side switching elements with the opening-closing member opening the electrical path to turn on both of the high- and low-side switching elements, resulting in short-circuit of both electrodes of the capacitor so that a discharge current is outputted from the capacitor based on the discharge control; and
 a manipulator that is configured to manipulate, based on a value of the discharge current, how to apply the voltage to the conduction control terminal of the one of the high- and low-side switching elements so as to control an amount of heat to be generated in the one of the high- and low-side switching elements, wherein:
 the discharge controller is configured to turn on and off the one of the high- and low-side switching elements several times while maintaining the other of the high and low-side switching elements in an on state to thereby short-circuit both electrodes of the capacitor several times; and
 the manipulator is configured to:
  use, as a manipulated variable for control of the amount of heat to be generated in the one of the high- and low-side switching elements, a ratio of an on time of the one of the high- and low-side switching elements compared to a period corresponding to a sum of the on time and an off time of the one of the high- and low-side switching elements, and
  reduce the ratio with an increase of the discharge current being outputted from the capacitor based on the discharge control.

2. A discharge control apparatus for a power converting system, the power converting system comprising: a power converter including a series-connected member of a voltage-controlled high-side switching element and a voltage-controlled low-side switching element, each of the voltage-controlled high- and low-side switching elements having a conduction control terminal, the power converter being configured to convert power of a DC power source into a desired power; a capacitor electrically interposed between the power converter and the DC power source and an opening-closing member configured to open and close an electrical path between the power converter and the DC power source, the discharge control apparatus comprising:
 a discharge controller that is configured to carry out discharge control by:
  determining a voltage to be applied to the conduction control terminal of each of the high- and low-side switching elements such that a current in a non-saturation region of one of the high- and low-side switching elements is lower than a current in a non-saturation region of the other of the high- and low-side switching elements; and
  applying the voltage to the conduction control terminal of each of the high- and low-side switching elements with the opening-closing member opening the electrical path to turn on both of the high- and low-side switching elements, resulting in short-circuit of both electrodes of the capacitor so that a discharge current is outputted from the capacitor based on the discharge control; and
 a manipulator that is configured to manipulate, based on a value of the discharge current, how to apply the voltage to the conduction control terminal of the one of the high- and low-side switching elements so as to control an amount of heat to be generated in the one of the high- and low-side switching elements, wherein:
 the discharge controller is configured to turn on and off the one of the high- and low-side switching elements several times while maintaining the other of the high- and low-side switching elements in an on state to thereby short-circuit both electrodes of the capacitor several times; and
 the manipulator is configured to:
  use, as a manipulated variable for control of the amount of heat to be generated in the one of the high- and low-side switching elements, a value of the voltage to be applied to the conduction control terminal of the one of the high- and low-side switching elements, and
  reduce the value of the voltage to be applied to the conduction control terminal of the one of the high- and low-side switching elements as the discharge current being outputted from the capacitor based on the discharge control increases.

3. The discharge control apparatus according to claim 1, further comprising a temperature measurer that measures a value of a temperature of the one of the high- and low-side switching elements, wherein the manipulator manipulates how to apply the voltage to the conduction control terminal of the one of the high- and low-side switching elements to thereby control the temperature of the one of the high- and low-side switching elements based on the measured value of the temperature of the one of the high- and low-side switching elements fed back from the temperature measurer as a result of the manipulation of the manipulator.

4. A discharge control apparatus for a power converting system, the power converting system comprising: a power converter including a series-connected member of a voltage-controlled high-side switching element and a voltage-controlled low-side switching element, each of the voltage-controlled high- and low-side switching elements having a conduction control terminal, the power converter being configured to convert power of a DC power source into a desired power; a capacitor electrically interposed between the power converter and the DC power source; and an opening-closing member configured to open and close an electrical path between the power converter and the DC power source, the discharge control apparatus comprising:

a discharge controller that is configured to carry out discharge control by:

determining a voltage to be applied to the conduction control terminal of each of the high- and low-side switching elements such that a current in a non-saturation region of one of the high- and low-side switching elements is lower than a current in a non-saturation region of the other of the high- and low-side switching elements; and applying the voltage to the conduction control terminal of each of the high- and low-side switching elements with the opening-closing member opening the electrical path to turn on both of the high- and low-side switching elements, resulting in short-circuit of both electrodes of the capacitor so that a discharge current is outputted from the capacitor based on the discharge control; and a manipulator configured to manipulate, based on a value of the discharge current, how to apply the voltage to the conduction control terminal of the one of the high- and low-side switching elements so as to control an amount of heat to be generated in the one of the high- and low-side switching elements, wherein the discharge controller is configured to turn on and off the one of the high- and low-side switching elements several times while maintaining the other of the high- and low-side switching elements in an on state to thereby short-circuit both electrodes of the capacitor several times, and the manipulator is configured to:

use, as a manipulated variable for control of the amount of heat to be generated in the one of the high- and low-side switching elements, one of: a ratio of an on time of the one of the high- and low-side switching elements compared to a period corresponding to a sum of the on time and an off time of the one of the high- and low-side switching elements; and a value of the voltage to be applied to the conduction control terminal of the one of the high- and low-side switching elements; and use, as a manipulated variable for control of the temperature of the one of the high- and low-side switching elements, the other of: the ratio of the on time of the one of the high- and low-side switching elements compared to the period corresponding to the sum of the on time and the off time of the one of the high- and low-side switching elements; and the value of the voltage to be applied to the conduction control terminal of the one of the high- and low-side switching elements.

5. The discharge control apparatus according to claim 1, wherein the discharge controller turns on and off the high-side switching element several times while maintaining the low-side switching element in an on state to thereby short-circuit both electrodes of the capacitor several times.

6. The discharge control apparatus according to claim 1, wherein the discharge controller applies the voltage to the conduction control terminal of the one of the high- and low-side switching elements so that the one of the high- and low-side switching elements is driven in the non-saturation region thereof, and the discharge controller applies the voltage to the conduction control terminal of the other of the high- and low-side switching elements so that the other of the high- and low-side switching elements is driven in a saturation region thereof.

7. The discharge control apparatus according to claim 1, further comprising a current sensor that measures the value of the discharge current, wherein the manipulator manipulates, based on the value of the discharge current measured by the current sensor, how to apply the voltage to the conduction control terminal of the one of the high- and low-side switching elements so as to control the amount of heat to be generated in the one of the high- and low-side switching elements.

8. The discharge control apparatus according to claim 1, further comprising an abnormality determiner that determines whether there is an abnormality associated with the power converting system, wherein the discharge controller carries out the discharge control in response to when it is determined that there is an abnormality associated with the power converting system.

* * * * *